US007058161B2

(12) United States Patent
Inazuru et al.

(10) Patent No.: US 7,058,161 B2
(45) Date of Patent: Jun. 6, 2006

(54) X-RAY TUBE AND METHOD OF PRODUCING THE SAME

(75) Inventors: Tutomu Inazuru, Hamamatsu (JP); Tomoyuki Okada, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/492,818

(22) PCT Filed: Oct. 15, 2002

(86) PCT No.: PCT/JP02/10670

§ 371 (c)(1), (2), (4) Date: Oct. 13, 2004

(87) PCT Pub. No.: WO03/036676

PCT Pub. Date: May 1, 2003

(65) Prior Publication Data

US 2005/0058253 A1 Mar. 17, 2005

(30) Foreign Application Priority Data

Oct. 19, 2001 (JP) ............................ 2001-322577

(51) Int. Cl.
*G01N 23/06* (2006.01)
*H01J 35/16* (2006.01)

(52) U.S. Cl. ...................................... 378/143; 378/121

(58) Field of Classification Search ................ 378/140, 378/141, 142, 199, 203, 57, 143, 119, 121
See application file for complete search history.

(56) References Cited

U.S. PATENT DOCUMENTS

| | | | | |
|---|---|---|---|---|
| 2,167,275 | A * | 7/1939 | Gross et al. | 378/138 |
| 4,484,069 | A * | 11/1984 | Brenholdt | 356/3.02 |
| 2003/0068013 | A1 * | 4/2003 | Ochiai et al. | 378/140 |

FOREIGN PATENT DOCUMENTS

| | | |
|---|---|---|
| JP | 57-025660 | 2/1982 |
| JP | 57-121139 | 7/1982 |
| JP | 63-18757 | 2/1988 |
| JP | 03-110753 | 5/1991 |
| JP | 04-149940 | 5/1992 |
| JP | 07-029487 | 1/1995 |
| JP | 07-296751 | 11/1995 |
| JP | 61-22545 | 1/1996 |
| JP | 10-255653 | 9/1998 |
| JP | 2001-23557 | 1/2001 |

* cited by examiner

*Primary Examiner*—Edward J. Glick
*Assistant Examiner*—Anastasia S. Midkiff
(74) *Attorney, Agent, or Firm*—Drinker Biddle & Reath LLP

(57) ABSTRACT

An X-ray tube 1 comprises of a bulb 10 joined to an envelope main body 4 at one end side thereof and having an inner cylinder portion 10*a* extending inwardly at the other end side thereof, a metal tube 11 having an extension portion 11*a* abutting against the inner cylinder portion 10*a* on the outer periphery of one end side thereof and projecting to the outside of the bulb 10 through the inner cylinder portion 10*a* at the other end side thereof, and a target supporter 12 supporting a target T at the one end side thereof and inserted into the metal tube 11 at the other side thereof. The inner cylinder portion 10*a* of the bulb 10 and the extension portion 11*a* of the metal tube 11 are fuse-bonded to each other, and the target supporter 12 is welded to the end portion of the metal tube 11 projecting from the bulb 10.

5 Claims, 12 Drawing Sheets

X-RAY TUBE AND METHOD OF PRODUCING THE SAME

FIELD OF THE ART

The present invention relates to an X-ray tube and a method for making the X-ray tube, and particularly to a micro-focus X-ray tube in which an X-ray focus point can be remarkably finely set, and a method for making the X-ray tube.

BACKGROUND ART

An X-ray tube outputs X-rays by inpinging electrons on a target, and conventionally has been utilized as an X-ray generator such as an X-ray inspection apparatus or the like which is used for nondestructive inspection, non-contact inspection or the like. For a sample of Such X-ray tube, one disclosed in Japanese Unexamined Examined Utility Model Application No. H03-110753 is well known. The X-ray tube described in this publication has a vacuum envelope molded insulating material such as glass or the like in a substantially cylindrical shape. Both end portions of the vacuum envelope are inwardly folded over the overall peripheries thereof, and thus inner cylinder portions extending to the inside of the envelope are formed at both ends of the vacuum envelope. An electron generating unit containing a cathode filament, a focus electrode, etc., are fixed in one inner cylinder portion. Furthermore, a metal tube is fuse-bonded to the other folded portion. A target supporter for supporting a target is fixed to the metal tube. Accordingly, the electron generating unit and the target oppose each other.

Recently, in order to enhance the sharpness and magnification of a radioscopy image shooting by an X-ray inspection apparatus or the like, it has been required to reduce the dimension (diameter) of the X-ray focus point in the X-ray tube to a smaller point. Therefore, needs for a so-called micro-focus X-ray tube which can set the X-ray focus point to an extremely small point has been increasingly grown. In order to set the X-ray focus point to an extremely small point as described above, it is required to mount a target receiving electrons to a vacuum envelope accurately.

DISCLOSURE OF THE INVENTION

However, it has been difficult to secure the metal tube to the vacuum envelope accurately when the inner cylinder portion and the metal tube are fuse-bonded to each other in the conventional X-ray tube as described above. Furthermore, in the conventional X-ray tube, the metal tube and the target supporter can be fixed to each other in the vacuum envelope. Therefore, much effort is needed to fix the target supporter to the metal tube accurately. As described above, it has been difficult in the conventional X-ray tube to set the X-ray focus point to an extremely small point due to the dimensional accuracy and fabrication accuracy in the making process.

Therefore, the present invention has an object to provide an X-ray tube in which respective components are fabricated accurately and the X-ray focus point can be set to an extremely small point, and a method for making an X-ray tube which can easily make an X-ray tube in which the X-ray focus point can be set to an extremely small point while remarkably keeping the dimension accuracy and the fabrication accuracy in the making process.

In order to achieve the above object, an X-ray tube is an X-ray tube for impinging electrons emitted from an electron generating unit on a target and outputting X-rays, comprising an envelope main body having an accommodation portion for accommodating the electron generating unit; an insulating bulb joined to the envelope at one end side thereof and having an inner cylinder portion extending inwardly at the other end side thereof, a metal tube having an extension fuse bonded to the inner cylinder portion on the outer periphery of one end side thereof and projecting outwardly from the valve through the inner cylinder portion at the other end side thereof, and a target supporter supporting a target at one end side thereof, inserted through the metal tube at the other side thereof and fuse-bonded to the end portion of the metal tube.

The X-ray tube impinging electrons are emitted from an electron generating unit on a target to output X-rays. Therefore, the X-ray tube comprises an electron generating unit containing a cathode for generating electrons, etc., a target as an anode and a target supporter for supporting the target. Furthermore, the X-ray tube is provided with an envelope main body and a bulb. The envelope main body and the bulb constitute the vacuum envelope accommodating the electron generating unit, the target, etc.

The envelope main body has an accommodation portion for accommodating the electron generating unit. The bulb is designed in a substantially cylindrical shape by insulating material such as glass, ceramic or the like, and one end side thereof is joined to the envelope main body. An inner cylinder portion extending inwardly is provided at the other end portion of the bulb. That is, the other end portion of the bulb is folded inwardly over the overall periphery so that a hole portion is formed at the center portion. A metal tube for fixing the target supporter is secured to the bulb.

The metal tube is provided at one end side thereof with an extension portion which can abut against the inner cylinder portion of the bulb. That is, one end portion of the metal tube is folded outwardly over the overall periphery and a cylinder portion having substantially the same diameter as the inner cylinder portion of the bulb is formed on the outer periphery of one end side of the metal tube. Furthermore, the other end side of the metal tube can be inserted through the inner cylinder portion of the bulb. In addition, the other end side of the target supporter for supporting the target can be inserted through the metal tube.

The X-ray tube comprising the above components according to the present invention is made according to the following procedure. In this case, the metal tube is secured to the bulb previously. When the metal tube is secured to the bulb, (the end face of) the inner cylinder portion and (the end face of) the extension portion of the metal tube are fuse-bonded to each other under a state where the metal tube is projected from the inner cylinder portion to the outside of the bulb. At this time, the metal tube can be reliably positioned in the bulb, and thus both can be fuse-bonded to each other accurately.

For example, after the bulb is joined to the envelope main body, the target supporter is welded to the end portion of the metal tube projecting from the bulb while the other end of the target supporter (the end portion of the target supporter at which the target is not supported) is inserted into the metal tube fixed to the bulb. At this time, the target supporter is slid relatively to the metal tube while a jig, an optical position sensor or the like is used, whereby the securing position of the target can be determined accurately. The work of welding the target supporter to the metal tube can be easily performed from the outside of the bulb, and thus the target supporter and the metal tube can be firmly fixed to each other accurately. In addition, the inside of the vacuum envelope comprising the envelope main body and the bulb can be kept air-tight.

As described above, in the X-ray tube of the present invention, the respective components can be fabricated while positioned with extremely high accuracy, and the positional relationship between the electron generating unit and the target is determined accurately. Accordingly, according to the X-ray tube, the X-ray focus point can be set to an extremely small point.

In an X-ray tube making method according to the present invention, an x-ray tube for impinging electrons emitted from an electron generating unit accommodated in an envelope main body on a target supported by a target supporter to output X-rays, by using a bulb having an inwardly-extending inner cylinder portion at the opposite side to the side thereof to be joined to the envelope main body and a metal tube provided with an extension portion abutting against the inner cylinder portion of the bulb on the outer periphery thereof and is insertable through the inner cylinder portion, the end face of the inner cylinder portion and the extension portion of the metal tube are fuse-bonded to each other while the metal tube is projected from the inner cylinder portion to the outside of the bulb, the target supporter is inserted into the metal tube, and the target supporter is welded to the end portion of the metal tube projecting from the bulb.

According to the X-ray tube making method described above, the respective components can be fabricated while remarkably keeping the dimension accuracy and the fabrication accuracy in the manufacturing process. Accordingly, when the X-ray tube making method described above is used, there can be easily made an X-ray tube in which the X-ray focus point can be set to an extremely small point.

In this case, when the target supporter is welded to the end portion of the metal tube, the target supporter is preferably positioned to the metal tube by using a jig. Furthermore, when the target supporter is welded to the end portion of the metal tube, the target supporter may be positioned to the metal tube by using position detecting means.

BEST MODE FOR CARRYING OUT THE INVENTION

Figure 1:
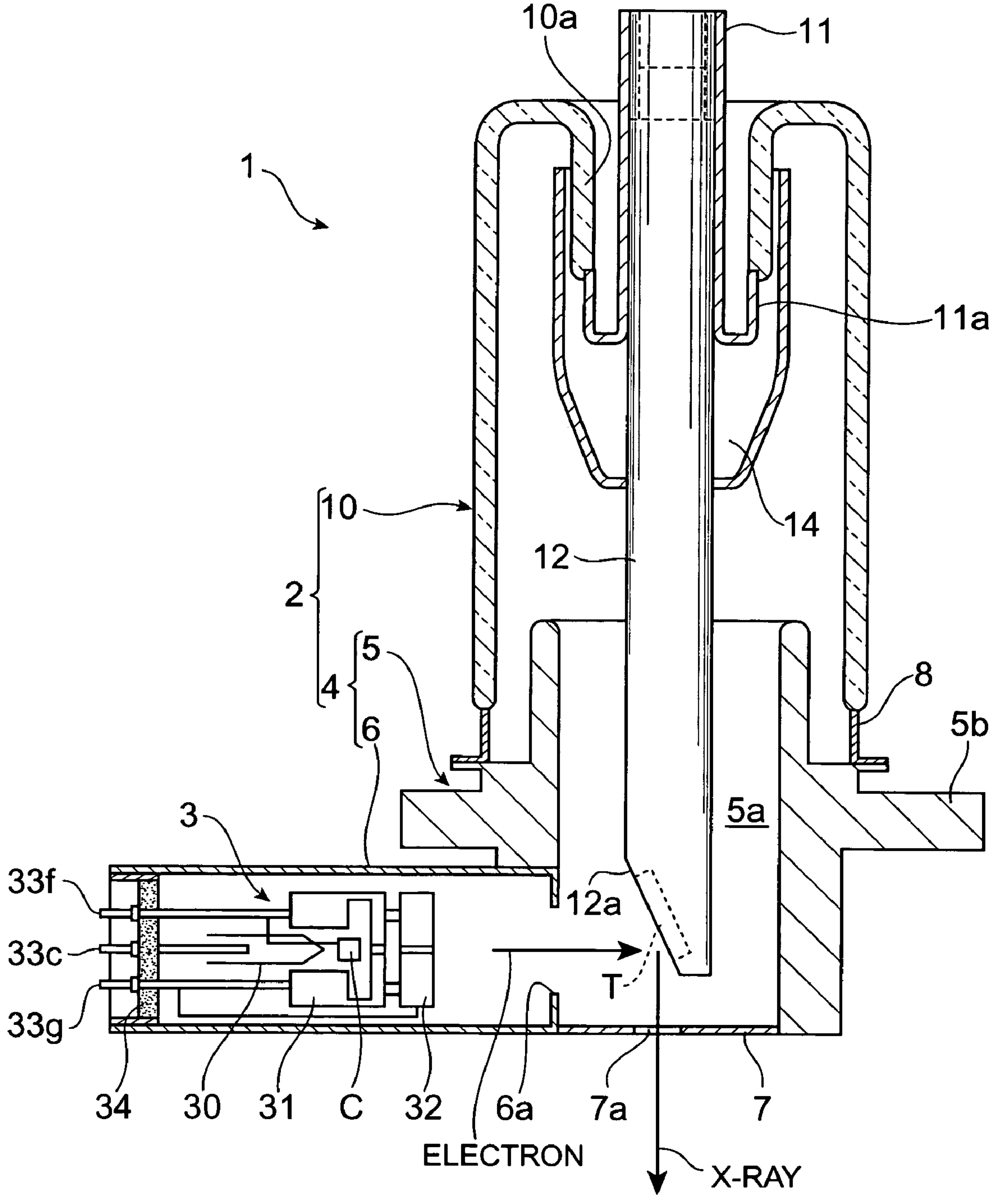
FIG. 1 is a cross-sectional view showing an X-ray tube according to the present invention.

Preferred embodiments of the present invention will be described hereunder in detail with reference to the accompanying drawings. To facilitate the comprehension of the explanation, the same reference numerals denote the same parts, where possible, throughout the drawings, and a repeated explanation will be omitted.

FIG. 1 is a cross-sectional view showing a preferred embodiment of an X-ray tube according to the present invention. The X-ray tube 1 shown in FIG. 1 is suitably used as an X-ray generating source of an X-ray inspection apparatus, for example, and it comprises of a vacuum envelope 2, an electron generating unit (electron gun) 3, and a target T. The electron generating unit 3 has a cathode C which is a porous tungsten or the like, impregnated with BaO or the like. The target T is a laminated X-ray generating films formed of tungsten or the like through a protection layer on a carbon layer. The electron generating unit 3 and the target T are accommodated in the vacuum envelope 2, and when electrons emitted from the electron generating unit 3 impinge against the target T in the vacuum envelope 2, an X-ray is output. As shown in FIG. 1, the vacuum envelope 2 mainly comprises an envelope main body 4 and a bulb 10.

Figure 2:
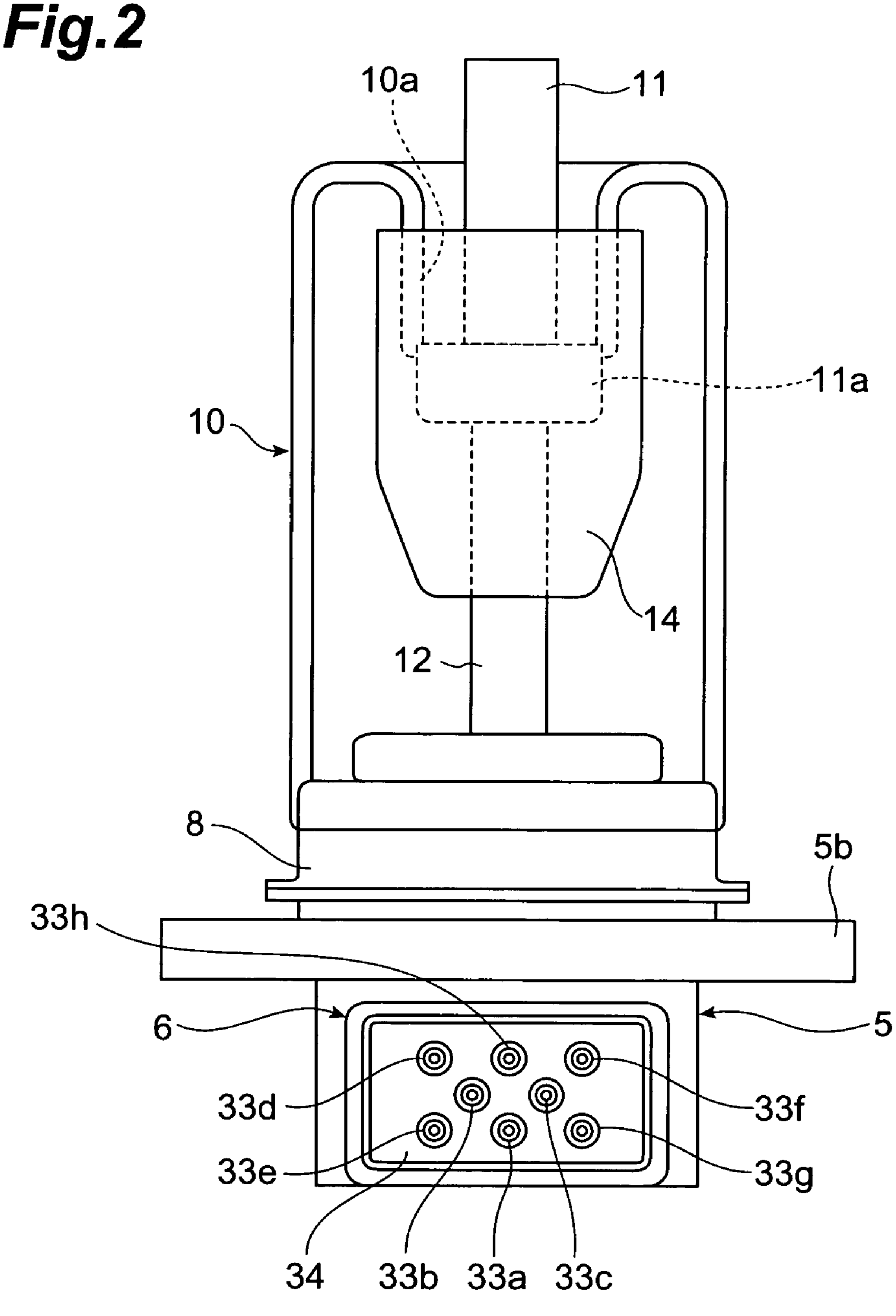
FIG. 2 is a side view thereof.

The envelope main body 4 comprises a body portion 5 in which the target T serving as an anode is accommodated, and an electron gun accommodating portion 6 in which the electron generating unit 3 serving as a cathode is accommodated. The body portion 5 is formed of metal or the like in a cylindrical shape, and has an inner space 5*a*. A flange portion 5*b* fixed to a housing or the like of the X-ray inspection apparatus (not shown) is provided on the outer periphery of the body portion 5. Furthermore, a lid plate 7 having an output window 7*a* is fixed to the lower portion of the body portion 5 in FIG. 1, and one end side of the inner space 5*a* is closed by the lid plate 7. The electron gun accommodating portion 6 is formed in a cylindrical shape so as to have a substantially rectangular cross-section as shown in FIG. 2, and connected (fixed) to the lower portion of the side portion of the body portion 5. As shown in FIG. 1, the axial center of the body portion 5 and the axial center of the electron gun accommodating unit 6 are substantially orthogonal to each other, and the inside of the electron gun accommodating portion 6 intercommunicates with the internal space 5*a* of the body portion 5 through an aperture 6*a*.

Figure 3:
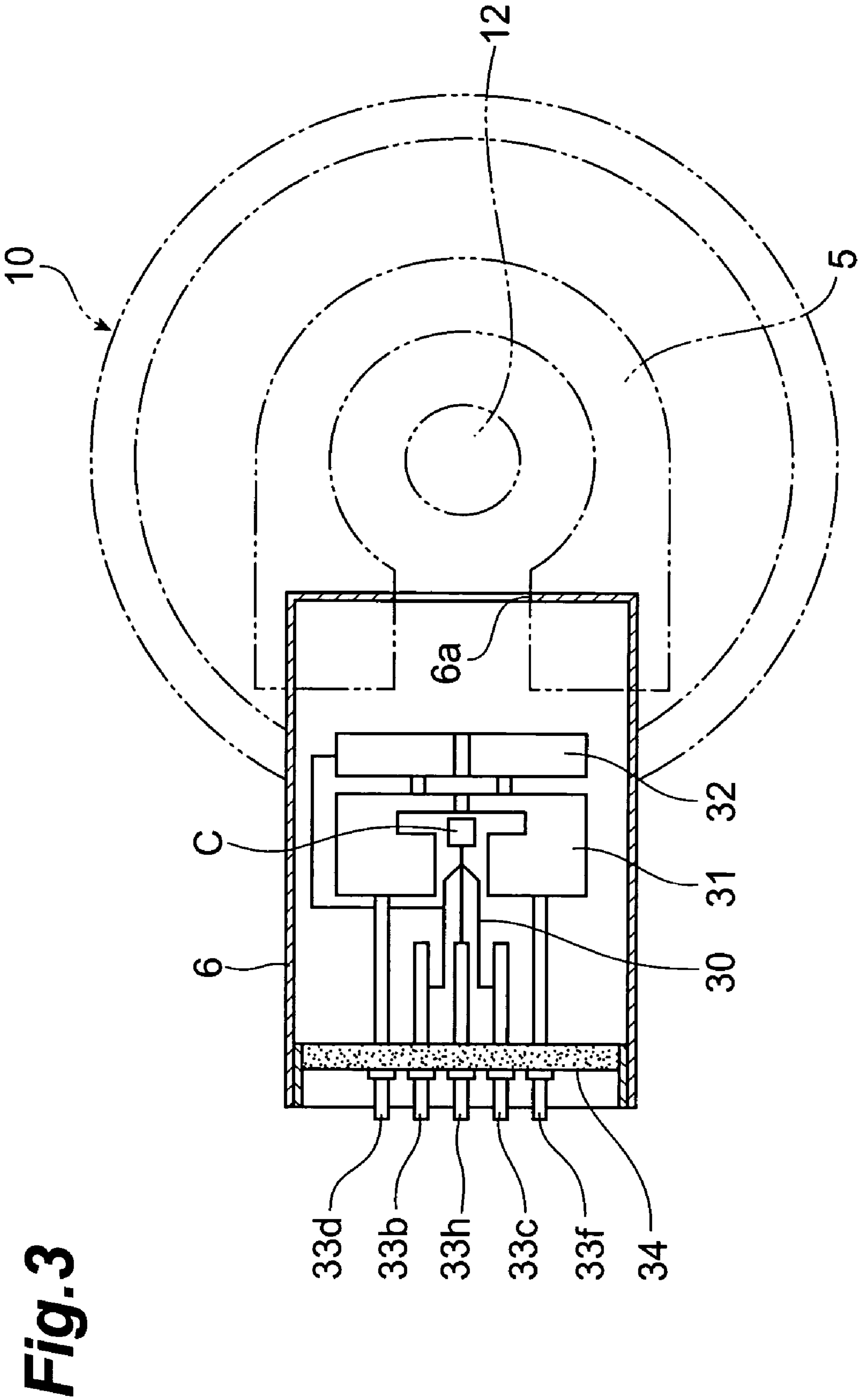
FIG. 3 is a cross-sectional view showing the construction of an electron gun accommodating portion of the X-ray tube.

The electron generating unit 3 accommodated in the electron gun accommodating portion 6 will be described. As shown in FIG. 1 and FIG. 3, the electron generating unit 3 contains a cathode C, a heater 30, a first grid electrode 31 and a second grid electrode 32. The cathode C, the heater 30, the first grid electrode 31 and the second grid electrode 32 are secured to a stem board 34 through plural (eight in this embodiment) pins 33*a* to 33*h* extending in parallel. Specifically, the cathode C is secured to the pin 33*a* (see FIG. 2) fixed to the stem board 34, and supplied with electric power from the outside through the pin 33*a*. Likewise, the heater 30 is secured to the pins 33*b* and 33*c* (see FIG. 2) fixed to the stem board 34, and supplied with electric power from the outside through the pins 33*b* and 33*c*.

Furthermore, the first grid electrode 31 is secured to the pins 33*d*, 33*e*, 33*f* and 33*g* fixed to the stem board 34, and supplied with electric power from the outside through these pins 33*d* to 33*g*. The second grid electrode 32 is secured to the pin 33*h* fixed to the stem board 34, and supplied with electric power from the outside through the pin 33*h*. As described above, the electron generating unit 3 in which the cathode C, etc., are unified to the stem board 34 is inserted from the end portion at the opposite side to the aperture 6*a* into the electron gun accommodating portion 6, and the stem board 34 is fixed to the end portion of the electron gun accommodating portion 6.

The bulb 10 constituting the vacuum envelope 2 in combination with the envelope main body 4 is formed of insulating material such as glass, ceramic or the like in a substantially cylindrical shape. As shown in FIG. 1, a ring member 8 formed of metal or the like is fuse-bonded to one end side (the lower end side in FIG. 1) of the bulb 10. The ring member 8 is joined (welded) to the body portion 5 constituting the envelope main body 4. As described above, one end side of the bulb 10 is joined to the envelope main body 4.

Figure 4:
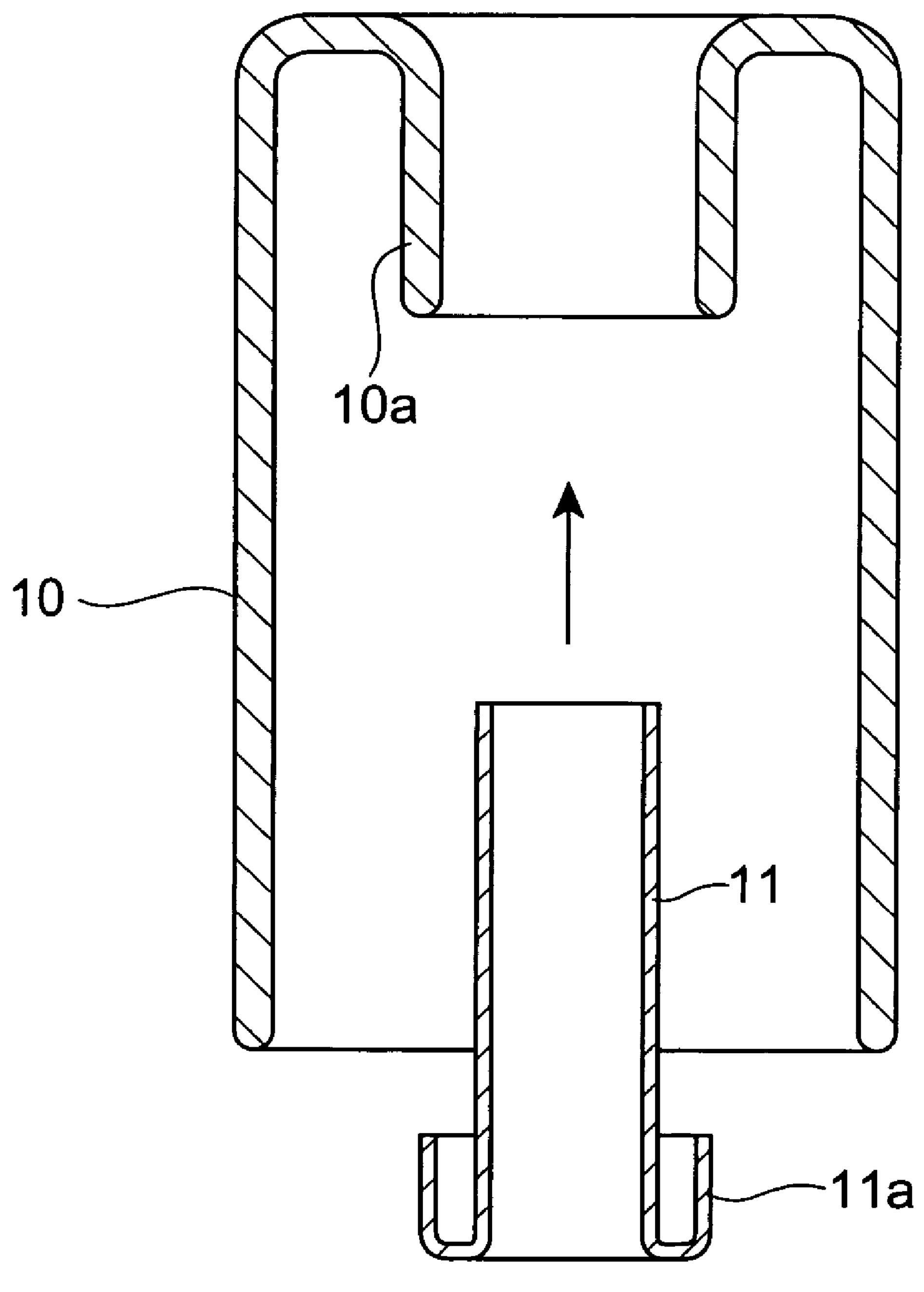
FIG. 4 is a cross-sectional view showing a bulb and a metal tube constituting the X-ray tube.

On the other hand, as shown in FIG. 1 and FIG. 4, an inner cylinder portion 10*a* having a cylindrical shape extending inwardly is provided on the other end side (the upper end side in FIG. 1 and FIG. 4) of the bulb 10. That is, the other end portion (upper end portion) of the bulb 10 is folded inwardly across the overall periphery thereof so that a hole portion is sectionally formed at the center portion, whereby the other end side of the bulb 10 is opened to the outside through the inside of the inner cylinder portion 10*a*. The metal tube 11 for supporting the target T in the body portion 5 is secured to the inner cylinder portion 10*a* of the bulb 10.

As shown in FIG. 4, the metal tube 11 basically has an outer diameter smaller than the inner diameter of the inner cylinder portion 10*a* of the bulb 10. The metal tube 11 also has an extension portion 11*a* on the outer periphery at one end side thereof (the lower end side in FIG. 4). That is, the one end portion of the metal tube 11 is outwardly folded over the overall periphery thereof, and a cylindrical portion (outer cylinder portion) having substantially the same diameter as the inner cylinder portion 10*a* of the bulb 10 is formed on the outer periphery at the one end side of the metal tube 11. The other end side (the upper end side in FIG. 4) of the metal tube 11 can be inserted into the inner cylinder portion 10*a* of the bulb 10.

When the other end side of the metal tube 11 is being inserted into the inner cylinder portion 10*a* of the bulb 10, the end face of the extension portion 11*a* abuts against the end face of the inner cylinder portion 10*a* equipped to the bulb 10. When the extension portion 11*a* abuts against the inner cylinder portion 10*a*, the other end portion of the metal tube 11 is projected outwardly from the bulb 10 through the inner cylinder portion 10*a* as shown in FIG. 1. The end face of the bulb 10 and the end face of the extension portion 11*a* are fuse-bonded to each other.

Into the metal tube 11 secured to the bulb 10 as described above, the other end side of the target supporter 12 for supporting the target T at one end side thereof is inserted. The target supporter 12 is formed of copper material or the like in a rod shape, and a slant surface 12*a* (see FIG. 1) which is inclined so as to be far from the electron generating unit 3 as approaching from the bulb 10 side to the body portion 5 side (in FIG. 1, from the upper side to the lower side) is provided at one end side (the lower end side in FIG. 1) of the target supporter 12. The target T is embedded at the end portion of the target supporter 12 so that the surface thereof is aligned with the slant surface 12*a*.

The other end portion (the upper end portion in FIG. 1) of the target supporter 12 is welded to the end portion of the metal tube 11 projecting from the bulb 10, whereby the target supporter 12 extends substantially in parallel to the axial centers of the bulb 10 and the body portion 5, and also it is substantially orthogonal to the travel direction of electrons from the electron generating unit 3. Accordingly, when electrons emitted from the electron generating unit (electron gun) 3 impinge against the target T in the vacuum envelope 2, an X-ray is output from the surface of the target T in a direction substantially orthogonal to the travel direction of the electrons. The X-ray is discharged to the outside through the output window 7*a* covering the open end (the end portion at the opposite side to the bulb 10 side) of the body portion 5. A cover electrode 14 is mounted so as to cover the fuse-bonded portion between the inner cylinder portion 10*a* and the extension portion 11*a* of the metal tube 11 in the bulb 10.

Next, the method for manufacturing the X-ray tube 1 constructed as described above, that is, the X-ray tube making method according to the present invention will be described. When the X-ray tube 1 comprising the above-described components according to the present invention is fabricated, the body portion 5 and the electron gun accommodating portion 6 are joined to each other to fabricate the outer envelope main body 4 at a predetermined stage, and also the metal tube 11 is secured to the bulb 10 previously. When the metal tube 11 is secured to the bulb 10, the end face of the inner cylinder portion 10*a* and the end face of the extension portion 11*a* of the metal tube 11 are fuse-bonded to each other under a state where the metal tube 11 is projected from the inner cylinder portion 10*a* to the outside of the bulb 10. At this time, the end portion of the bulb 10 at the opposite side to the inner cylinder portion 10*a* is perfectly opened (see FIG. 4), and thus the metal tube 11 can be easily and accurately positioned in the bulb 10. Accordingly, the bulb 10 and the metal tube 11 can be fuse-bonded to each other while they are positioned to each other accurately.

Figure 5:
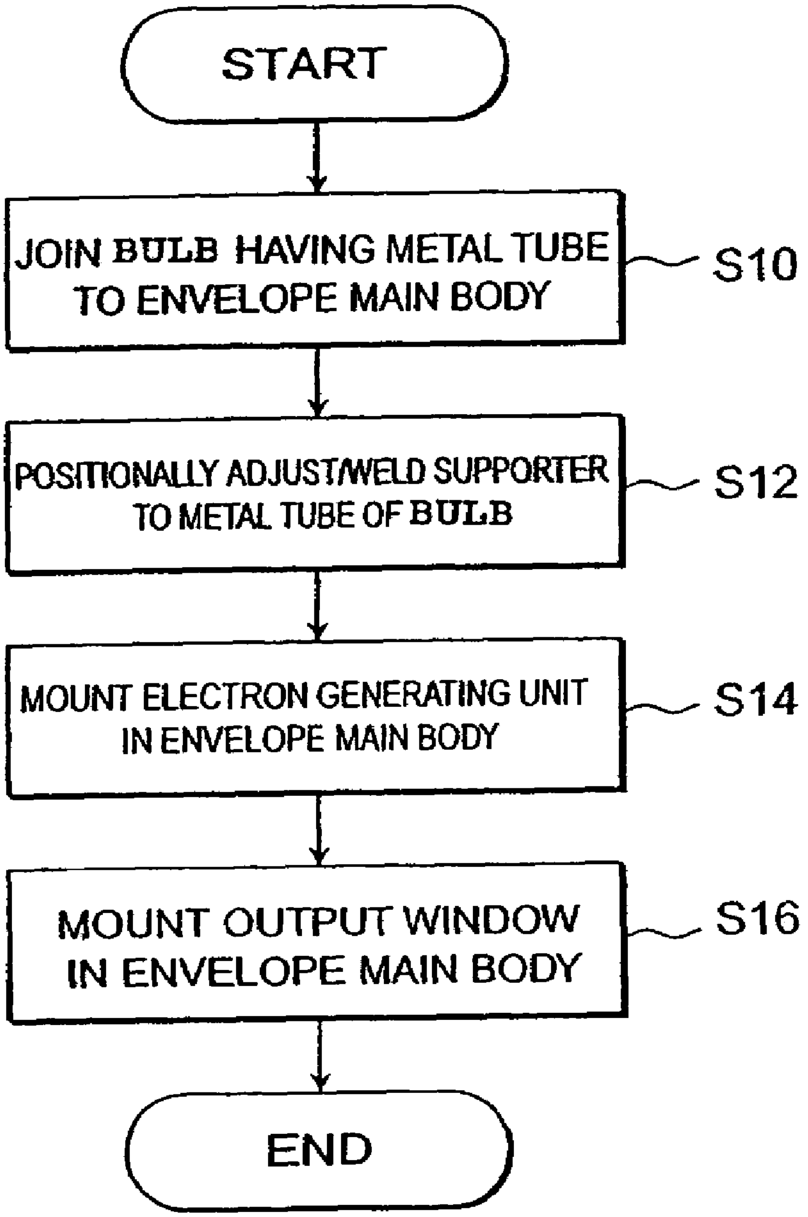
FIG. 5 is a flowchart showing an X-ray tube making method according to the present invention.

Thereafter, the respective components are assembled according to the procedure shown in FIG. 5. That is, first, the bulb 10 securing the metal tube 11 and the envelope main body 4 are joined to each other (S10). In this case, the ring member 8 which is fuse-bonded to the bulb 10 previously is welded to the envelope main body 4 (body portion 5). Subsequently, the bulb 10 is joined to the envelope main body 4, and the other end of the target supporter 12 (the end portion of the target supporter 12 at which the target T is not supported) is inserted into the metal tube 11 fixed to the bulb 10, and under this state, the target supporter 12 is positioned to the bulb 10. Furthermore, the target supporter 12 is welded to the end portion of the metal tube 11 projecting from the bulb 10 (S12).

Figure 6:
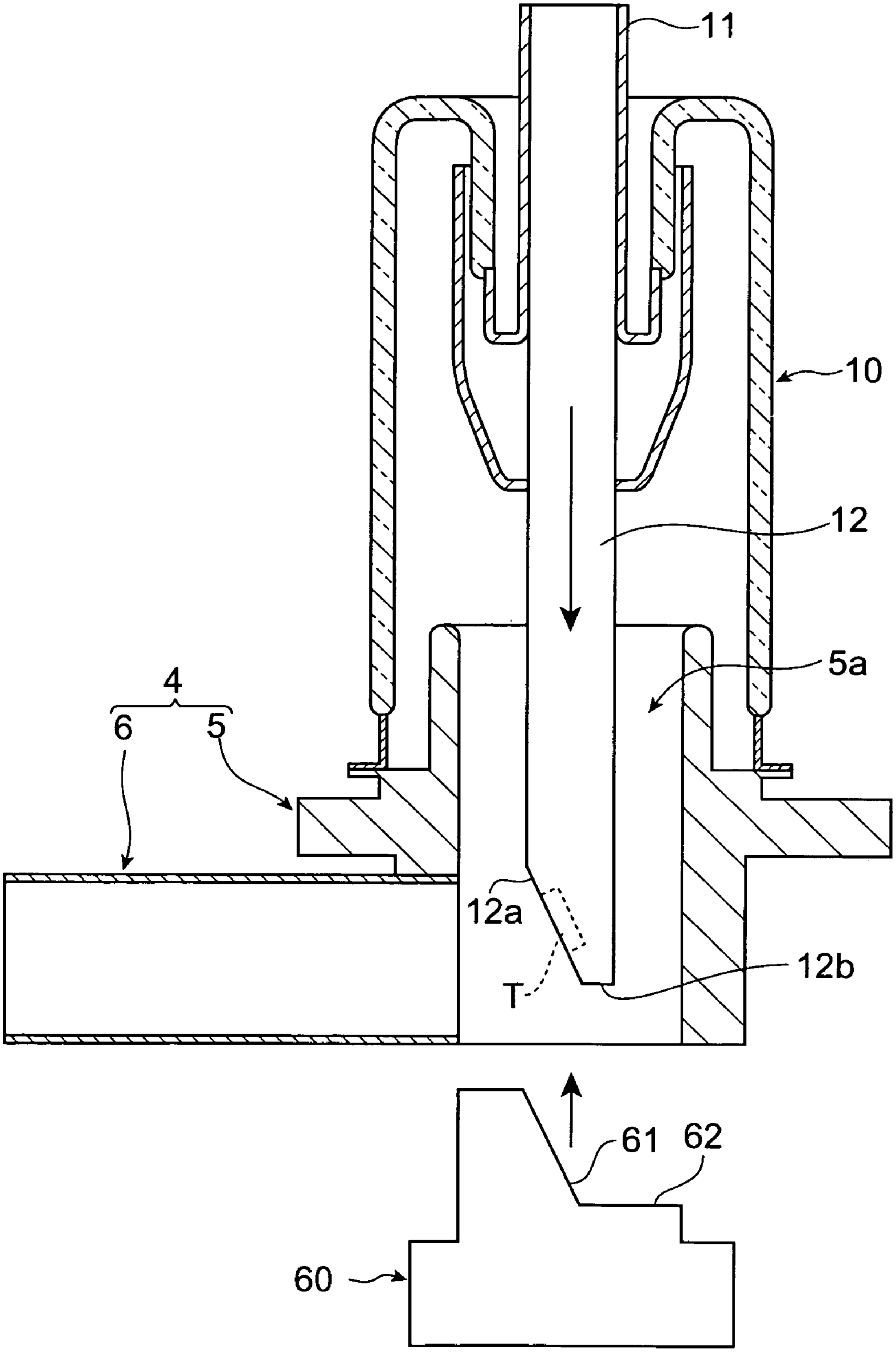
FIG. 6 to FIG. 9 are diagrams showing a method for positioning a target supporter to a bulb.
Figure 7:
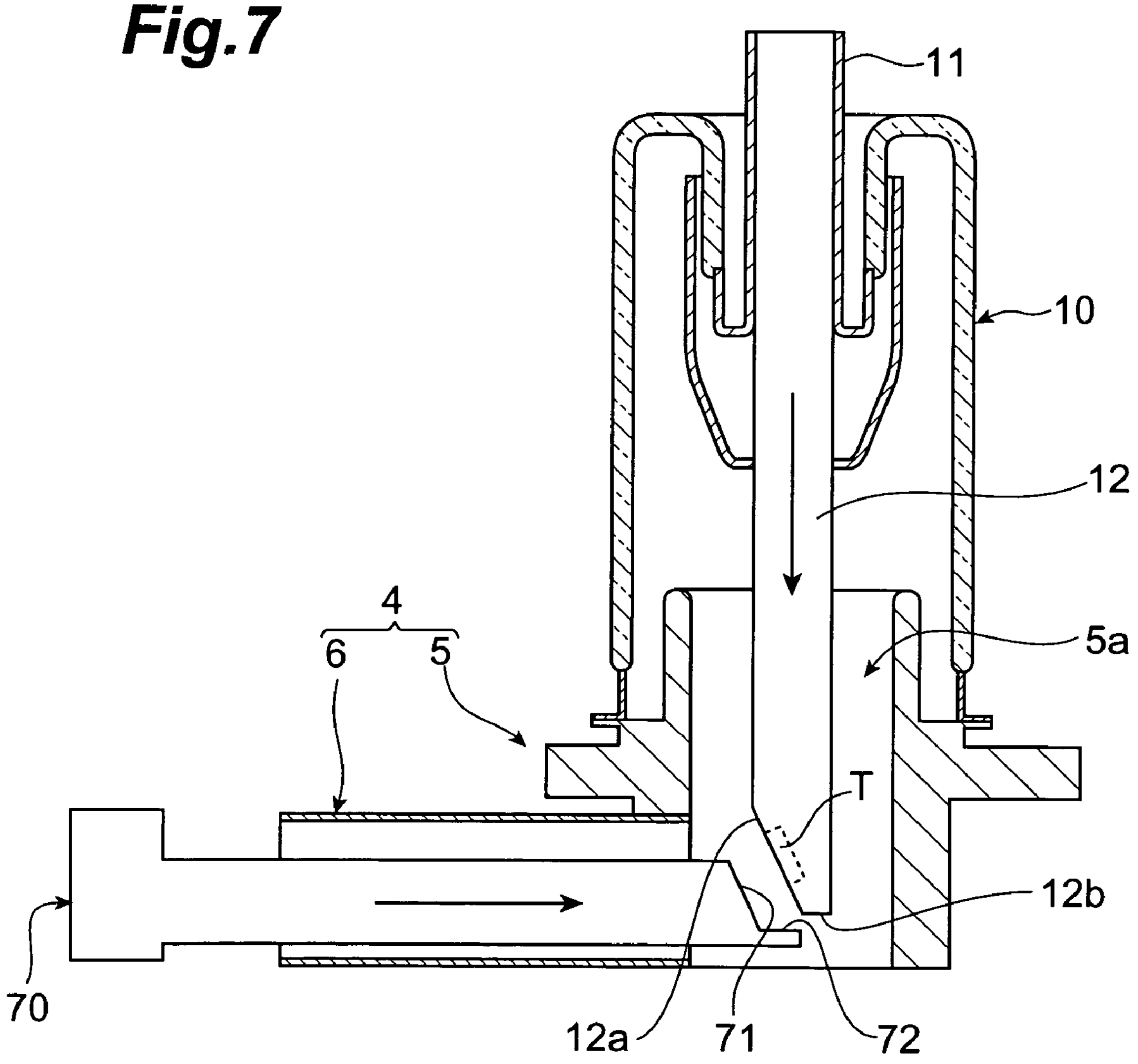

Here, when the target supporter 12 is positioned to the bulb 10 (metal tube 11), jigs as shown in FIG. 6 and FIG. 7 are preferably used. A jig 60 shown in FIG. 6 can be engangedly fitted in the inner space 5*a* of the body portion constituting the envelope main body 4 from the open end at the opposite side to the bulb 10. When the jig 60 is fitted in the inner space 5*a* of the body portion 5, the jig 60 is fitted to the end portion of the target supporter 12 inserted into the metal tube 11 so that the target T is located at a predetermined mount place. That is, the jig 60 has a slant surface 61 abutting against the slant surface 12*a* of the target supporter 12 and a regulating surface 62 abutting against the end face 12*b* of the target supporter 12.

A jig 70 shown in FIG. 7 can be inserted into the inner space 5*a* of the body portion 5 constituting the envelope main body 4 from the open end of the electron gun accommodating portion 6. When the jig 70 is inserted into the inner space 5*a* of the body portion 5 so as to be in parallel to the axial center of the electron gun accommodating portion 6, the jig 70 is fitted to the end portion of the target supporter 12 inserted into the metal tube 11 so that the target T is located at a predetermined mount place. That is, the jig 70 has a slant surface 71 abutting against the slant surface 12*a* of the target supporter 12 and a regulating surface 72 abutting against the end face 12*b* of the target supporter 12.

Figure 8:
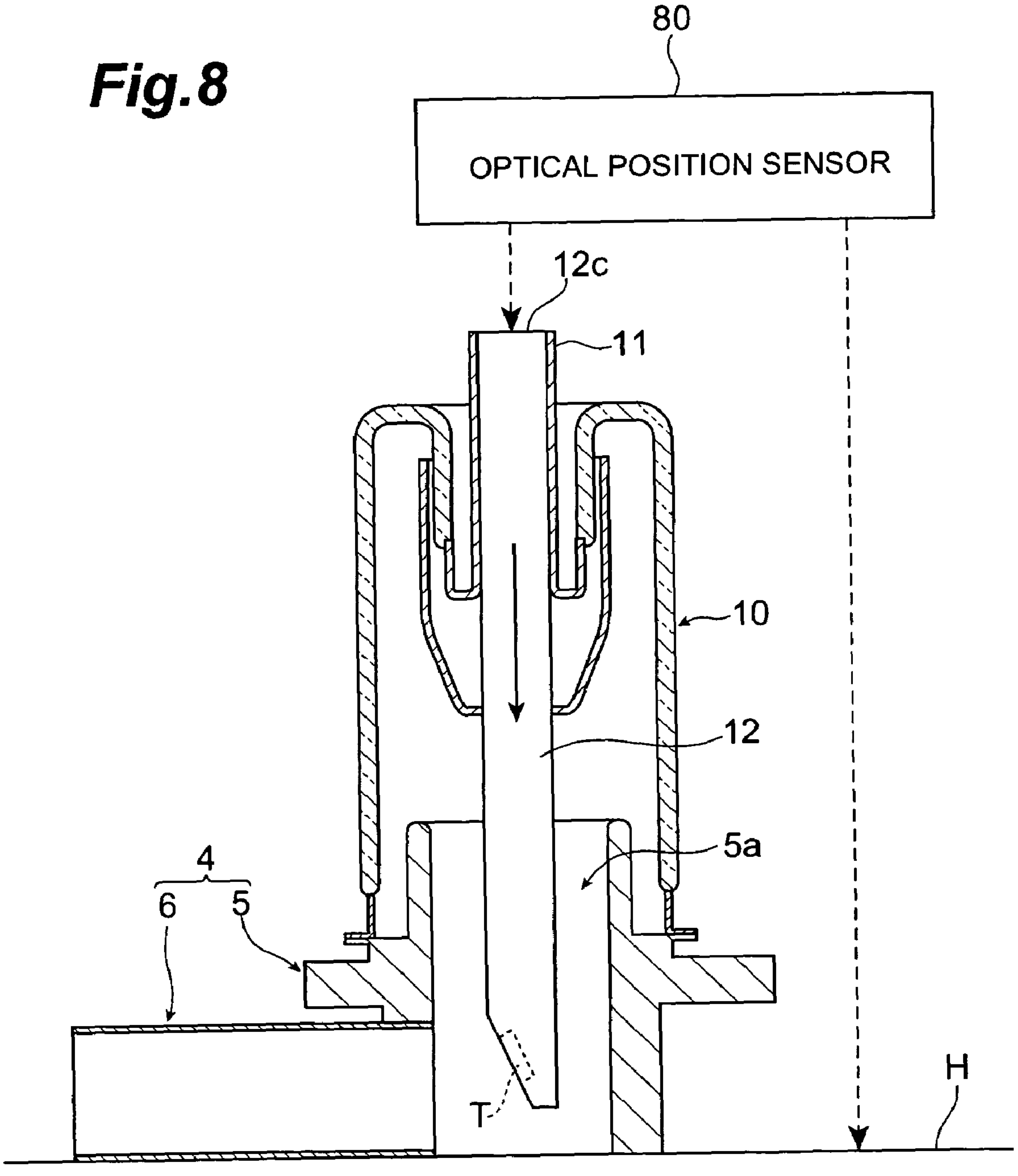
Figure 9:
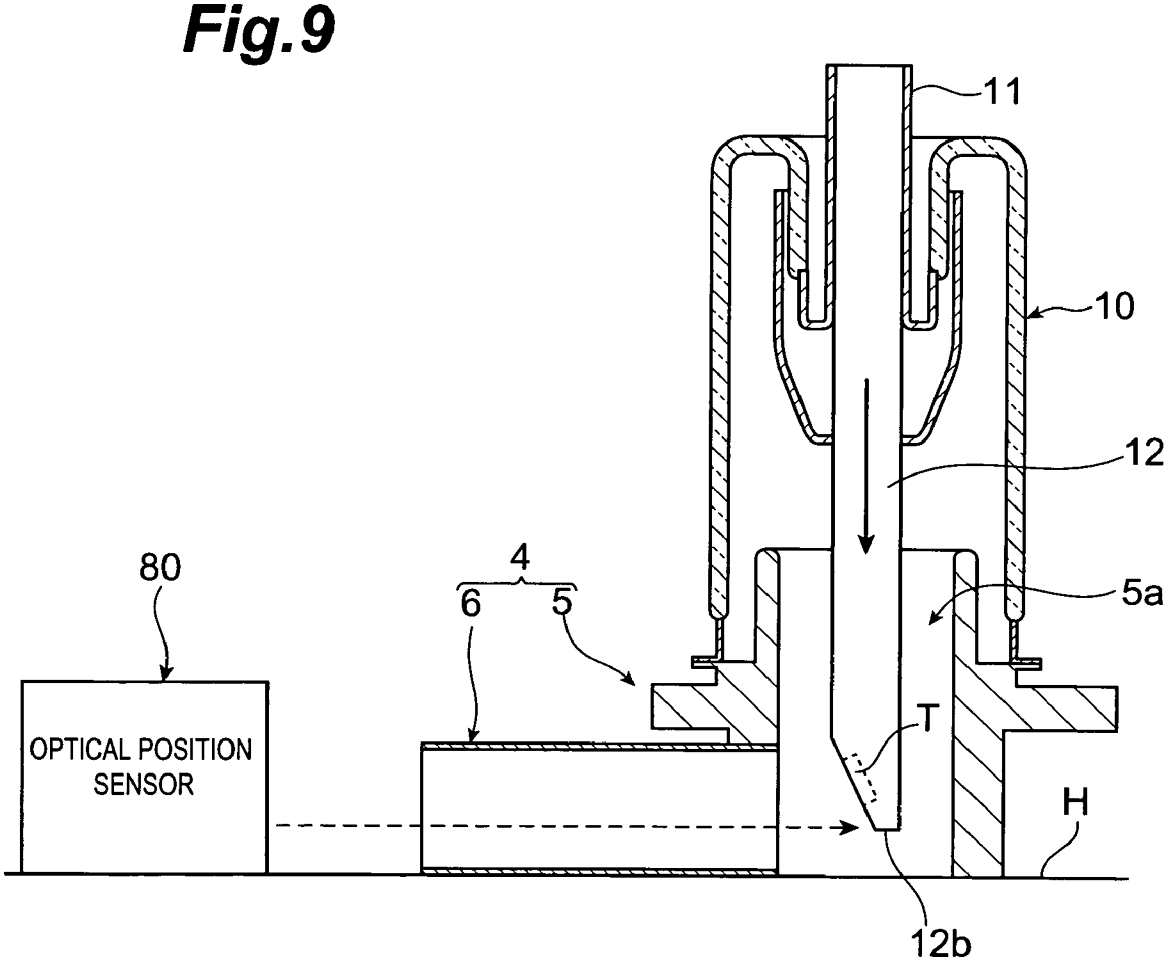

When the target supporter 12 is positioned to the bulb 10, an optical position sensor 80 (position detecting means) as shown in FIG. 8 and FIG. 9 may be used. When the target supporter 12 is positioned to the bulb 10 (metal tube 11) by using such an optical position sensor 80, the envelope main body 4 and the bulb 10 are mounted on the horizontal plane H so that the axial center of the bulb 10 and the metal tube 11 is located vertically. In the case as shown in FIG. 8, measurement light is irradiated from the optical position sensor 80 to the end face 12*c* of the target supporter 12 at the metal tube 11 side and the horizontal plane H. That is, in this case, the target supporter 12 is slid with respect to the metal tube 11 so that the target T is located at a predetermined mount place while detecting the distance between the horizontal plane H and the end face 12*c* of the target supporter 12.

In the case as shown in FIG. 9, the optical position sensor 80 is positioned on the horizontal plane H, the measurement light is irradiated from the optical position sensor 80 into the inner space 5*a* of the body portion 5 through the electron gun accommodating portion 6. And, in this case, the target supporter 12 is slid with respect to the metal tube 11 so that the target T is located at a predetermined mount place while detecting the end face 12*b* at the target T side of the target supporter 12. As described above, the mount position of the target T can be determined accurately by using the position detecting means such as the jigs 60 and 70, the optical position sensor 80 or the like and sliding the target supporter 12 relatively to the metal tube 11.

In S12, the welding work is carried out after the target supporter 12 is accurately positioned to the bulb 10 as described above. Here in S12, the work of welding the target supporter 12 to the metal tube 11 can be easily carried out from the outside of the bulb 10. Accordingly, the target supporter 12 and the metal tube 11 can be firmly fixed to each other accurately, and also the inside of the vacuum envelope 2 comprising the envelope main body 4 and the bulb 10 can be reliably kept air-tight. The cover electrode 14 may be mounted in the bulb 10 or fixed to the target supporter 12 before the target supporter 12 is welded to the metal tube 11.

When the target supporter 12 is fixed to the bulb 10, the electron generating unit 3 is inserted into the electron gun accommodating portion 6, and the stem board 34 is fixed to the electron gun accommodating portion 6 (S14) so that the envelope is reliably kept air-tight. Furthermore, the lid plate 7 having the output window 7*a* formed therein is fixed to the body portion 5 of the envelope main body 4 so that the envelope can be reliably kept air-tight (S16), thereby completing the X-ray tube 1.

As described above, according to the X-ray tube making method according to the present invention, the respective components can be fabricated while remarkably keeping the dimension accuracy and the fabrication accuracy in the making process. Accordingly, by using the X-ray tube making method, the positional relationship between the electron generating unit 3 and the target T can be set accurately. According to the X-ray tube 1 made by this method, the X-ray focus point can be set to an extremely small point.

Figure 10:
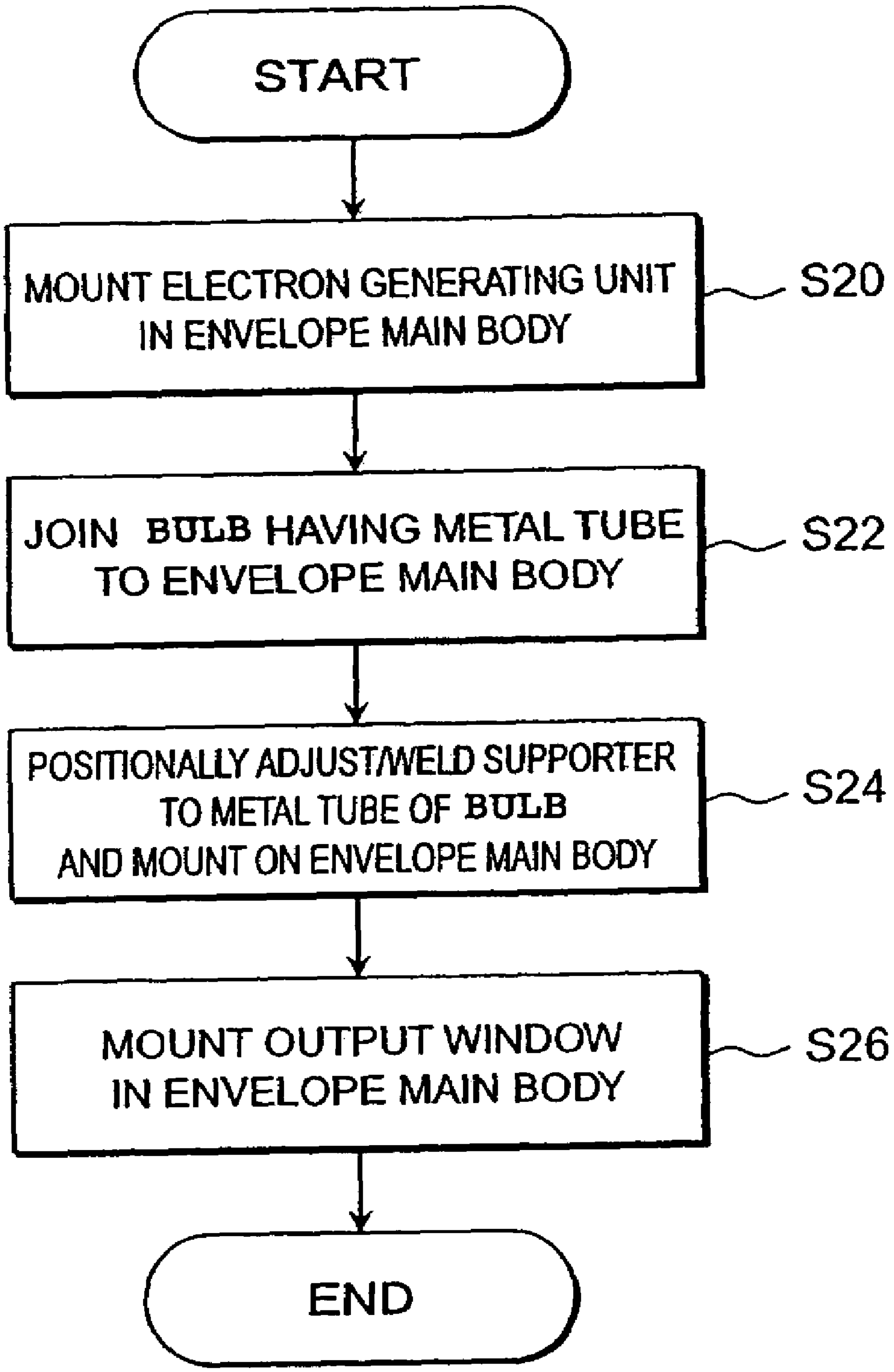
FIG. 10 to FIG. 12 are flowcharts showing another embodiment of the X-ray tube making method according to the present invention.
Figure 11:
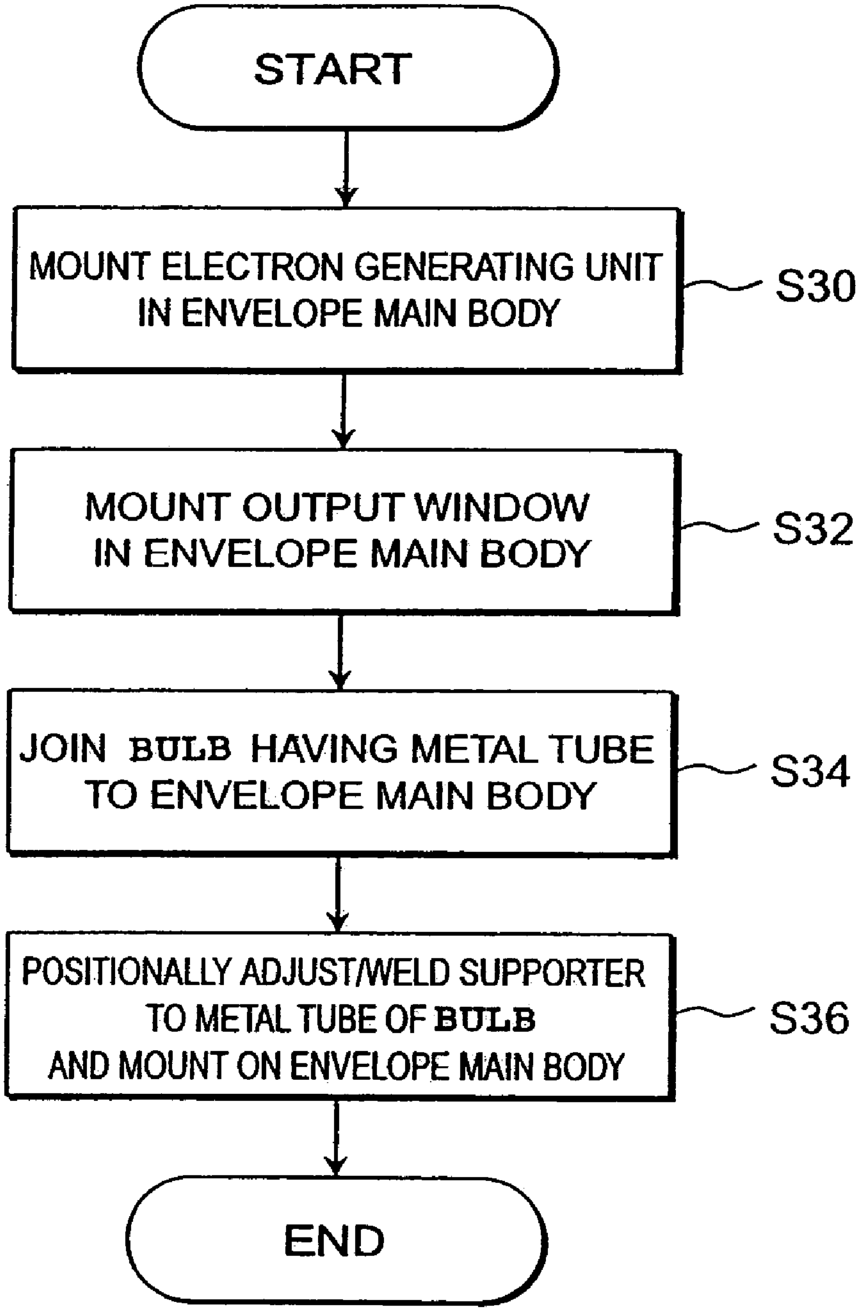
Figure 12:
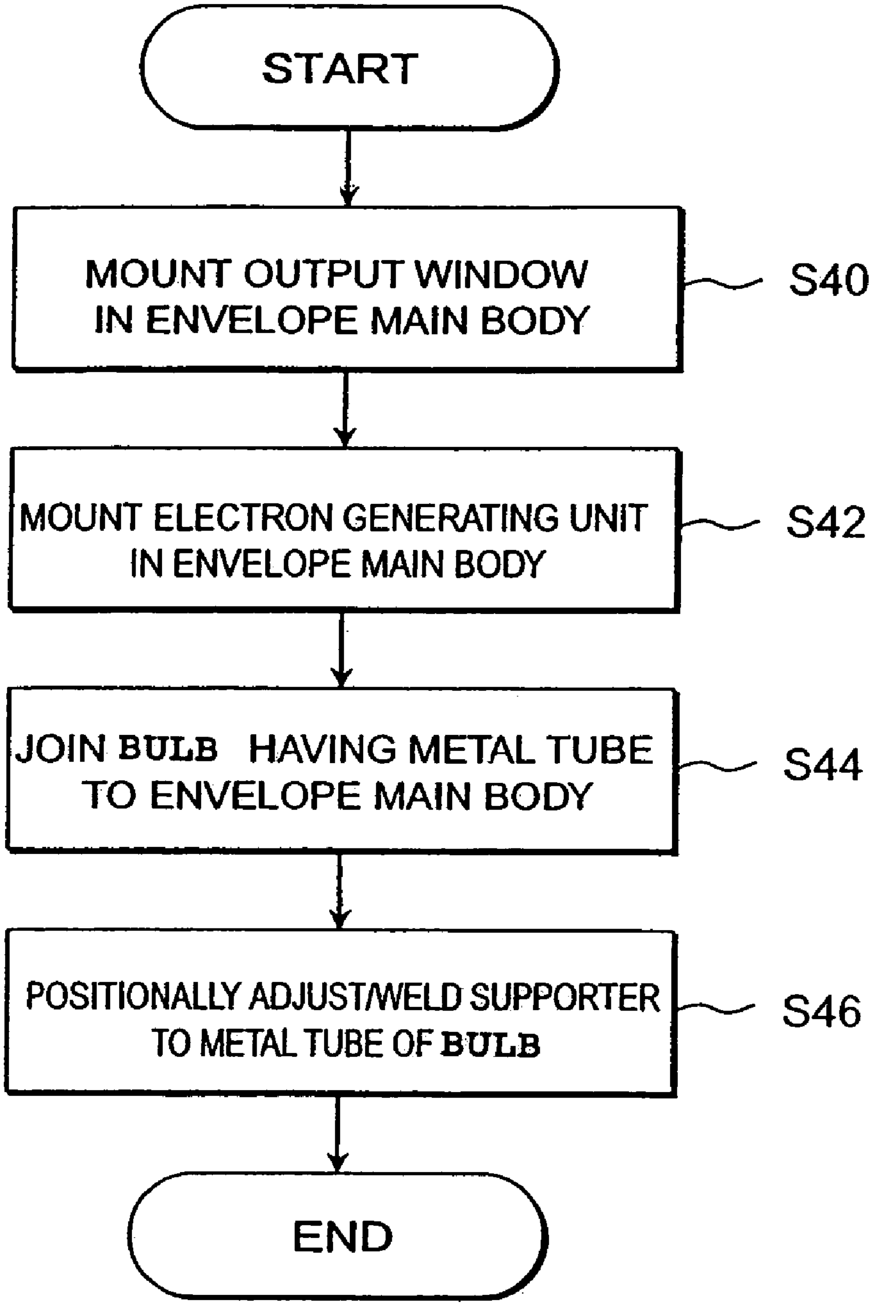

The making procedure of the X-ray tube 1 shown in FIG. 5 is merely an example, and various modes can be used as the making procedure of the X-ray tube 1. FIG. 10 to FIG. 12 show other making procedures of the X-ray tube 1. In this case, the body portion 5 and the electron gun accommodating portion 6 are joined to each other to fabricate an envelope main body 4 at a predetermined stage, and also the metal tube 11 is secured to the bulb 10 previously.

In the example shown in FIG. 10, the electron generating unit 3 is secured to the electron gun accommodating portion 6 of the envelope main body 4 (S20). The bulb 10 securing the metal tube 11 is fixed to the envelope main body 4 (S22). When the bulb 10 is fixed to the envelope main body 4, the target supporter 12 is inserted into the metal tube 11 fixed to the bulb 10, positioned and then welded to the metal tube 11 (S24). Here, when the work of S24 is started, the electron gun accommodating portion 6 has been already closed by the stem board 34. Accordingly, when the target supporter 12 is positioned to the bulb 10, the jig 60 shown in FIG. 6 is used or the optical position sensor 80 is used as shown in FIG. 8. Thereafter, the lid plate 7 having the output window 7*a* is fixed to the body portion 5 of the envelope main body 4 (S26), the X-ray tube 1 is completed.

In the example shown in FIG. 11, the electron generating unit 3 is secured to the electron gun accommodating portion 6 of the envelope main body 4 (S30). Subsequently, the lid plate 7 having the output window 7*a* is fixed to the body portion 5 of the envelope main body 4 (S32). When the lid plate 7 is fixed to the body portion 5 of the envelope main body 4, the bulb 10 fixed the metal tube 11 is fixed to the envelope main body 4 (S34). Thereafter, in S36, the target supporter 12 is welded to the metal tube 11. In this case, the inner space 5*a* of the body portion 5 has been already closed by the lid plate 7, and the electron gun accommodating portion 6 has been already closed by the stem board 34. Accordingly, in S36, the target supporter 12 is inserted from the outside of the bulb 10 into the metal tube 11, and also the target supporter 12 is positioned while the optical position sensor 80 is used as shown in FIG. 8, whereby the X-ray tube 1 is completed.

In the example shown in FIG. 12, the lid plate 7 having the output window 7*a* is first fixed to the body portion 5 of the envelope main body 4 (S40). Subsequently, the electron generating unit 3 is secured to the electron gun accommodating portion 6 of the envelope main body 4 (S42). When the electron generating unit 3 is mounted to the electron gun accommodating portion 6, the bulb 10 securing the metal tube 11 is fixed to the envelope main body 4 (S44). Thereafter, the target supporter 12 is welded to the metal tube 11 (S46). In this case, the inner space 5*a* of the body portion 5 has been already closed by the lid plate 7, and the electron gun accommodating portion 6 has been already closed by the stem board 34. Accordingly, in S46, the target supporter 12 is inserted into the metal tube 11 from the outside of the bulb 10, and also the target supporter 12 is positioned while the optical position sensor 80 is used as shown in FIG. 8, whereby the X-ray tube 1 is completed.

INDUSTRIAL APPLICABILITY

The X-ray tube and the X-ray tube making method according to the present invention are suitably used as a micro-focus X-ray tube which can set the X-ray focus point to an extremely small point, and the method for manufacturing the same.

The invention claimed is:

1. An X-ray tube for impinging electrons emitted from an electron generating unit on a target and outputting an X-ray, comprising:

an envelope main body having an accommodation portion for accommodating said electron generating unit;

an insulating bulb joined to said envelope main body at one end side of said bulb and having an inner cylinder portion extending inwardly at the other end side of said bulb;

a metal tube having an extension fuse-bonded to the inner cylinder portion on the outer periphery of one end side of said metal tube and projecting outwardly from said bulb through said inner cylinder portion at the other end side of said metal tube; and a target supporter supporting a target at one end side of said target supporter with the other end side of said target supporter being inserted through said metal tube and welded to an end portion of said metal tube projecting outside of said bulb;

wherein the X-ray tube comprises an abutting portion between the metal tube and the target supporter which is located outside the bulb.

2. A method of making an X-ray tube for impinging electrons emitted from an electron generating unit accommodated in an envelope main body on a target supported by a target supporter in order to output X-rays, the method comprising the steps of:

providing a bulb having an inwardly-extending inner cylinder portion at one end side of said bulb that is located opposite the other end side of said bulb which is to be joined to said envelope main body, and providing a metal tube having an extension portion abutting against said inner cylinder portion of said bulb on the outer periphery of said metal tube, said metal tube being insertable through said inner cylinder portion;

fuse-bonding an end face of said inner cylinder portion and the extension portion of said metal tube to each other while projecting said metal tube from the inner cylinder portion to the outside of said bulb; and inserting said target supporter into said metal tube and welding said target supporter to an end portion of said metal tube projecting outside of said bulb.

3. The X-ray tube making method according to claim 2, wherein when said target supporter is welded to the end portion of said metal tube, the target supporter is positioned to said metal tube by using jig.

4. The X-ray tube making method according to claim 2, wherein when said target supporter is welded to the end portion of said metal tube, said target supporter is positioned to said metal tube by using position detecting means.

5. The X-ray tube according to claim 1, wherein an inner diameter of the metal tube is substantially equal to an outer diameter of the target supporter.

* * * * *